J. H. Rohrman,

Dust Pan,

No. 2,721. Reissued Aug. 6, 1867.

Witnesses:
Thomas Francis
David Sundheimer

Inventor:
J. H. Rohrman

N. PETERS, PHOTO-LITHOGRAPHER, WASHINGTON, D. C.

United States Patent Office.

JOSEPH HALL ROHRMAN, OF PHILADELPHIA, PENNSYLVANIA.

*Letters Patent No.* 24,331, *dated June* 7, 1859; *reissue No.* 2,721, *dated August* 6, 1867.

IMPROVED DUST-PAN

The Schedule referred to in these Letters Patent and making part of the same.

TO ALL WHOM IT MAY CONCERN:

Be it known that I, JOSEPH HALL ROHRMAN, of Philadelphia, in the county of Philadelphia, and State of Pennsylvania, have invented a certain new and useful improvement in Dust-Pan; and I do hereby declare that the following is a full and exact description thereof, reference being had to the accompanying drawings, making part of this application.

In the ordinary constructing of dust-pan the bottom of the pan is formed of a plain sheet of metal, and the handle is formed with a tongue extending some distance along on the under side of the bottom of the pan, and soldered thereto to give rigidity to it, in order that, when the pan be pressed down to the floor to receive the dust, it shall not bend up at its front and middle portion. One great objection to this method of constructing dust-pans is the liability of the tongue of the handle, which runs along under the bottom of the pan, and is soldered thereto, to become loosened from the pan by the strain brought upon it when the front edge of the pan is pressed down (from the handle) upon the floor.

It has been customary in making dust-pans to "wire" the upper edge of the back side of the pan (to which the handle is partially attached) to give it rigidity; but this mode of construction involves considerable expense.

To provide the market with a dust-pan which shall not be subject to the objection above alluded to, and which shall be in every other way more lasting, desirable, and economic than the ordinary construction of dust-pan, and which shall not require to have the upper edge of its rear side "wired," is the object of my present invention; and to this end my invention consists, firstly, in forming the bottom of a dust-pan with corrugations, (struck up in the usual manner,) in such manner as to render it quite rigid, without any more weight or thickness of metal, and thus avoid the necessity of running a tongue or portion of the handle along under the bottom of the pan; and my invention consists, secondly, in rendering the top edge of the rear side of the pan rigid by bending the metal forward at about right angles to the rear side, extending it along about five-sixteenths or three-eighths of an inch, and then bending it down and "seaming" it, as will be hereafter described.

To enable those skilled to make and use my improvement, I will proceed to describe it, referring by letters to the accompanying drawings, forming part of this specification, and in which—

Similar letters denoting the same parts in the different views.

Figure 2:
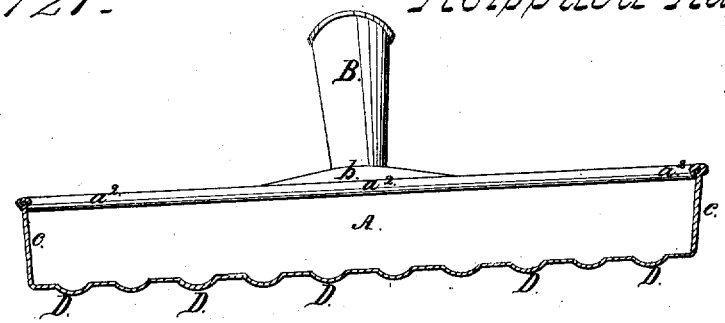
Figure 2 represents a vertical section at the line *x x* of fig. 1.
Figure 1:
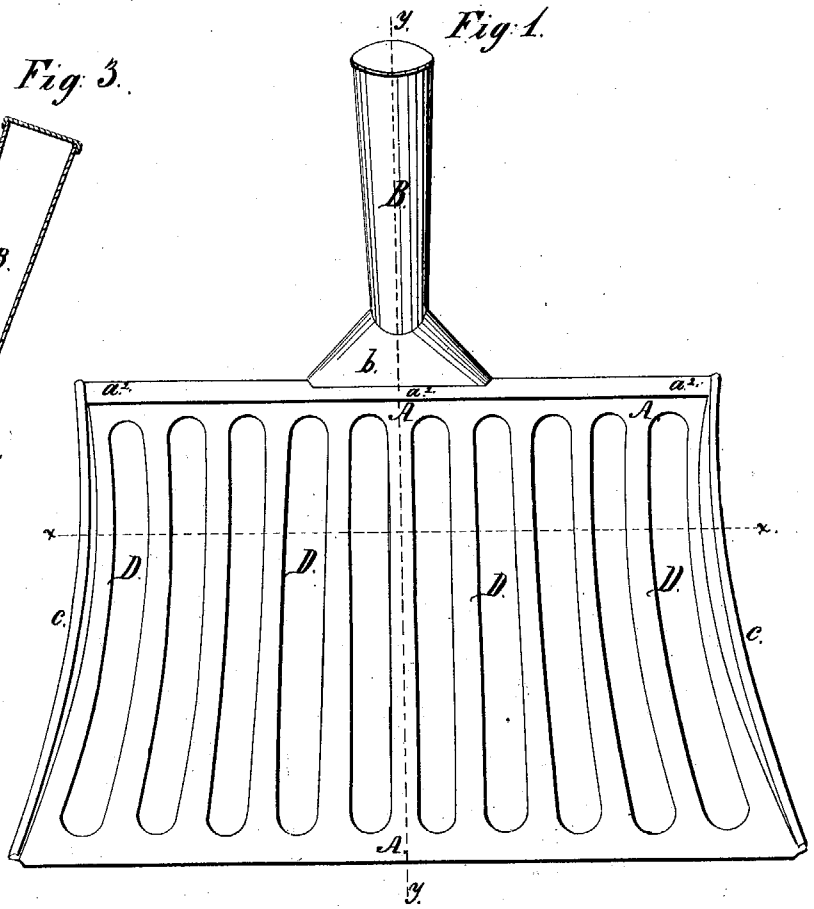
Figure 1 represents a top view of my improved construction of dust-pan.
Figure 3:
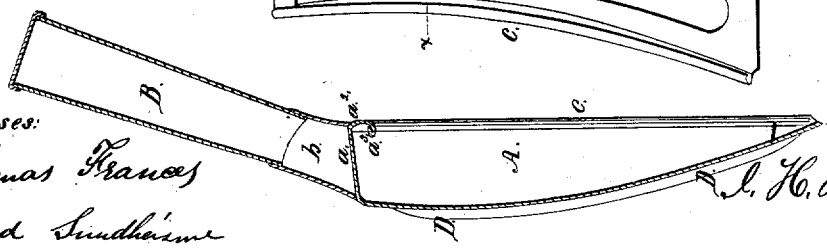
Figure 3 represents a vertical section at the line *y y* of fig. 1.

A represents the bottom of the pan, which is illustrated as having formed in it a series of concaves or flutes, D, running from front to back, or as being corrugated. This corrugation may be produced in the ordinary way, by striking up between dies, and may be varied with regard to the number, shape, and direction of the flutes, so long as they are so formed as to render the bottom of the pan rigid against the tendency to bend, caused by pressing its front edge down on the floor, and permit the extreme front edge of the pan to come conveniently in contact with a plane surface, and admit of the dust and dirt being readily brushed up into the pan. B is the handle of the pan, made in the usual manner, but attached to the rear side only of the pan by means of a flaring connecting-piece. *b c* are the sides of the pan, formed in the usual way. *a* is the rear or back side of the pan, which is run up to the usual height, but which, instead of being "wired" to render it stiff, is bent forward at $a^2$, and then downward, and "seamed" under at $a^3$. (See fig. 3.) By forming the bottom of the pan with corrugations, substantially as shown and described, it is made sufficiently stiff to render unnecessary any bracing of the handle, and all liability of the detachment of the handle, such as exists where the handle is extended along under the pan to stiffen it, as has been customary, is avoided. By forming the upper edge of the back of the pan as described, it is rendered more rigid and desirable than those now made, and without any "wiring."

Having explained my invention so that those skilled can make and use the same, what I claim as new, and desire to secure by Letters Patent, is—

A dust-pan formed with corrugations, substantially as described for the purposes set forth.

I also claim forming the back edges of the pan in the manner described, whereby it is rendered sufficiently rigid without any "wiring."

In testimony whereof I have hereunto set my hand and seal this sixth day of July, 1867.

J. HALL ROHRMAN. [L. S.]

Witnesses:

JNO. SIMPSON,

JOS. B. ROHRMAN.